United States Patent [19]
Sano

[11] Patent Number: 5,328,008
[45] Date of Patent: Jul. 12, 1994

[54] ROTATING DRUM IN AUTOMATIC TRANSMISSION

[75] Inventor: Kazuhito Sano, Shizuoka, Japan

[73] Assignee: Jatco Corporation, Fuji, Japan

[21] Appl. No.: 872,982

[22] Filed: Apr. 24, 1992

[30] Foreign Application Priority Data

May 7, 1991 [JP] Japan .................................. 3-131821

[51] Int. Cl.$^5$ .................................. F16D 67/04
[52] U.S. Cl. .................................. 192/17 R; 192/107 M; 188/77 R; 188/259
[58] Field of Search .................. 192/17 R, 17 A, 17 C, 192/17 D, 80, 85 AA, 107 T, 107 M; 188/77 R, 77 W, 250 H, 218 R, 249, 259, 251 A, 251 M

[56] References Cited

U.S. PATENT DOCUMENTS

| | | | |
|---|---|---|---|
| 316,789 | 4/1885 | Keiper | 188/259 X |
| 882,299 | 3/1908 | Dexter | 192/107 T X |
| 1,426,543 | 8/1922 | Bonner | 188/259 X |
| 2,822,218 | 2/1958 | Whitfield | 188/251 M X |
| 3,113,647 | 12/1963 | Tuttle | 192/107 M X |
| 3,236,349 | 2/1966 | Wiggins et al. | 192/85 AA X |
| 3,321,999 | 5/1967 | Greer | 192/17 R X |
| 4,237,749 | 12/1980 | Koivunen | |
| 4,693,353 | 9/1987 | Kobayashi et al. | 192/85 AA |

FOREIGN PATENT DOCUMENTS

| | | | |
|---|---|---|---|
| 62-251535 | 11/1987 | Japan | 188/77 R |
| 626284 | 9/1978 | U.S.S.R. | 188/77 R |

*Primary Examiner*—Richard M. Lorence
*Attorney, Agent, or Firm*—Foley & Lardner

[57] ABSTRACT

A clutch drum in an automatic transmission houses therein a clutch mechanism through which the clutch drum is driven. The clutch drum is rotatably mounted on a fixed shaft forming part of a transmission housing and comprised of a drum main body having a cylindrical drum section which is spaced from and coaxial with the fixed shaft. The drum main body is formed of aluminum alloy. A cylindrical friction material is fixed on the outer peripheral surface of the cylindrical drum section and frictionally contactable with a brake band wrapped around the drum main body. The brake is applied to the clutch drum upon tightening the brake band.

7 Claims, 3 Drawing Sheets

ROTATING DRUM IN AUTOMATIC TRANSMISSION

BACKGROUND OF THE INVENTION

1. Field of the Invention

This invention relates to improvements in a rotating drum in an automatic transmission, and more particularly to a frictionally sliding section of such a rotating drum.

2. Description of the Prior Art

Many rotating elements such as clutch drums are assembled in an automatic transmission, in which most of them have not only a single function but also multi-functions. An example of such a rotating element is disclosed in U.S. Pat. No. 4,237,749 and shown in FIG. 3 of the drawings. In FIG. 3, a clutch drum 101 is arranged rotatable around a fixed shaft 102 of a transmission casing 103 and includes an inner body 104 which is rotatably mounted on the fixed shaft 102 and encases therein a multiple disc clutch 105 having clutch plates 106 as clutch elements. Additionally, the inner body 104 is formed with a cylinder 107 in which a piston 108 is slidably movably disposed. The piston 108 functions to push the multiple disc clutch 105, serving as an engaging member for the clutch plates 106. The clutch drum 101 further includes an outer body 109 fixed to the inner body 104 at an outer peripheral portion. The outer peripheral surface 109a of the outer body 109 serves as a brake drum which incorporates with a brake band 110 disposed around the outer body 109.

As discussed above, the clutch drum 101 accomplishes a variety of functions and therefore unavoidably has a function(s) which is undesirable for the other function(s). That is to say, for example, the clutch drum outer body 109 is usually formed of a steel thick plate. This largely increases the weight of the clutch drum outer body 109, thereby raising problems from view points of weight lightening, performance improvement and improvement in efficiency of obtaining space for parts.

In the case of using a metal for the material of a frictionally sliding section, the coefficient of friction of the frictionally sliding section increases as the surface roughness increases and therefore decreases as the surface roughness decreases. Also, in the brake of the automatic transmission, the coefficient of friction of the above-mentioned clutch drum 101 is a serious factor which largely affects a shift shock, a time required for shifting and the like. For example, if the clutch drum 101 is formed of aluminum or aluminum alloy, a weight-lightening for the clutch drum will be expected. However, such a clutch drum is relatively soft and therefore the surface roughness of the frictionally sliding surface in slidable contact with the brake band unavoidably changes for a relatively short period of time as a result of wear of the frictionally sliding surface caused under repetition of tightening and loosening the brake band.

Accordingly, the clutch drum outer body 109 is inevitably formed of the steel thick plate while the clutch drum inner body 104 is formed of a pressed steel thin sheet. The clutch drum inner and outer bodies 104, 109 are then welded to each other to be combined, thereby complicating the production process of the clutch drum 101. Additionally, even in the case where the clutch drum outer body is formed of a steel thick plate despite the above-discussed production difficulty, there remains a problem in that the surface roughness of the outer peripheral surface 109a of the clutch drum outer body 109 changes with a lapse of time or a repetition of tightening the brake band as shown in FIG. 4.

A similar problem is encountered around the hub section 104a. That is to say, the hub section 104a formed of the relatively soft material (aluminum alloy) makes its wear at positions in sliding contact with seal rings 111 located at the opposite sides of an oil passage 112 through which oil is supplied to the cylinder 107. This increases a rotating friction of the clutch drum 101 thereby causing a performance degradation and an increased noise level.

SUMMARY OF THE INVENTION

It is an object of the present invention to provide an improved rotating drum in an automatic transmission, which is highly improved in performance required for a frictionally sliding surface of the drum which surface is slidably contactable with a braking member, while achieving a weight-lightening of the drum.

Another object of the present invention is to provide an improved rotating drum in an automatic transmission, in which the frictionally sliding surface of the drum can maintain a stable surface roughness and coefficient of friction, and the main body thereof can be formed of a relatively light and soft material.

A further object of the present invention is to provide an improved rotating drum in an automatic transmission, which can contribute to suppressing a shift shock of the automatic transmission and to simplifying the production process of the rotating drum.

A rotating drum according to the present invention is in an automatic transmission and comprised of a drum main body rotatably supported on a shaft. A frictionally sliding member is fixedly secured on a surface of said main body and formed of a material different from that of the drum main body.

By virtue of providing the frictionally sliding member on the drum main body, the automatic transmission can be effectively prevented from its performance deterioration due to a change in surface roughness of a frictionally sliding surface which is slidingly contactable with, for example, a braking member, while the drum main body can be formed of a material which is effective for a weight-lightening and for simplification of production thereof.

DETAILED DESCRIPTION OF THE INVENTION

Figure 1:
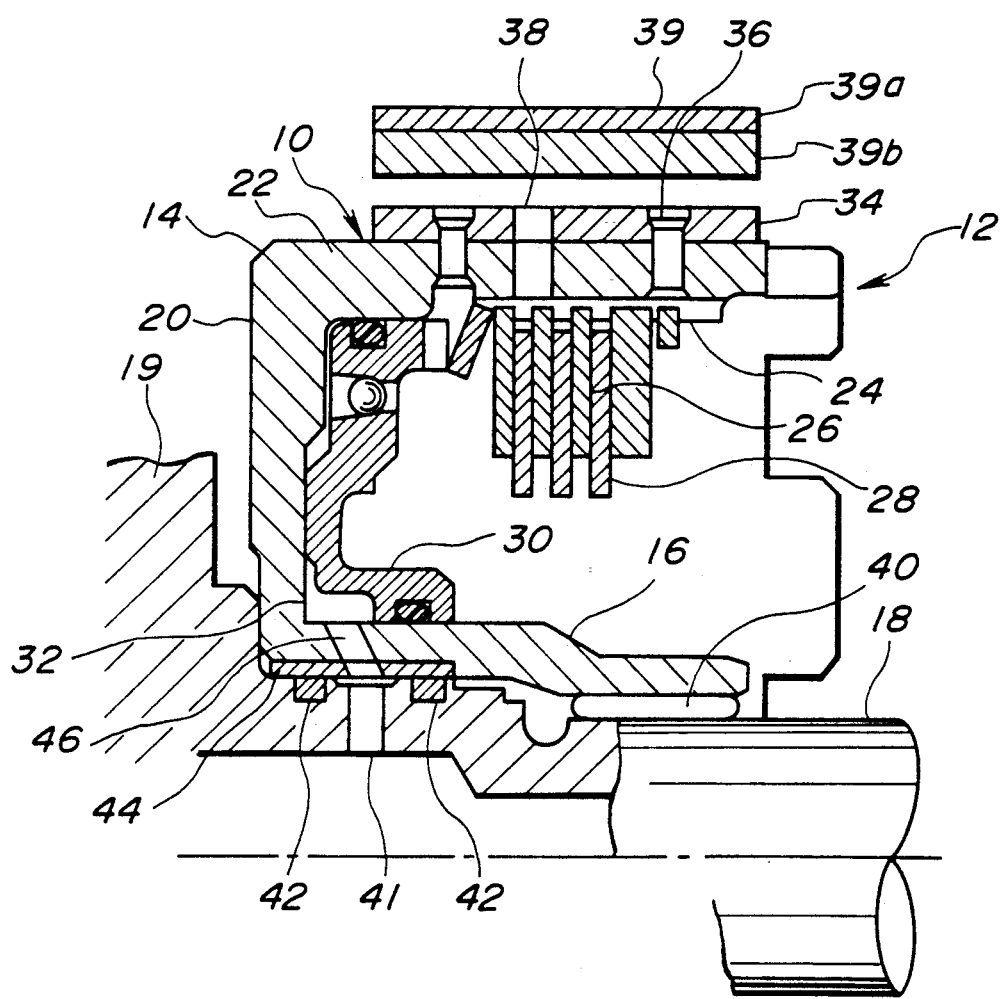
FIG. 1 is a fragmentary sectional view of an embodiment of a rotating drum in an automatic transmission, in accordance with the present invention.
Figure 2:
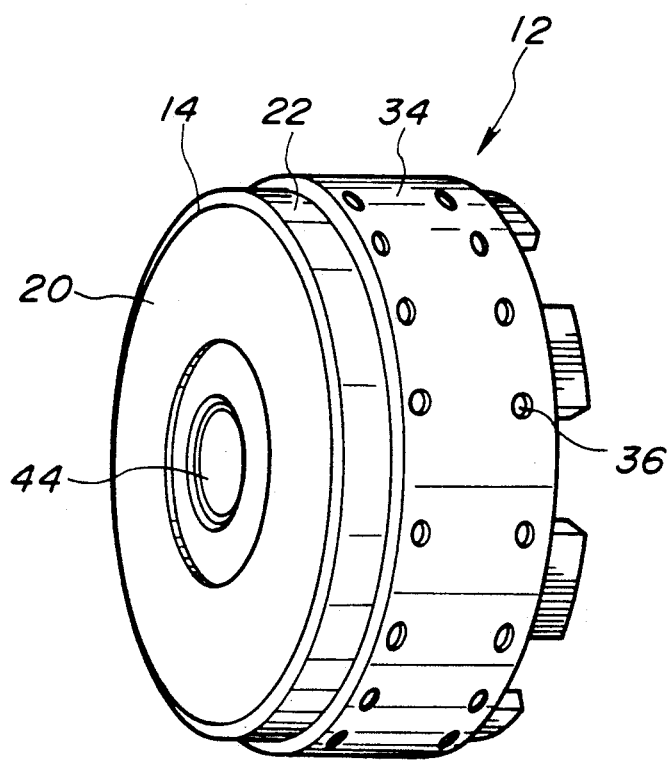
FIG. 2 is a perspective view of the rotating drum of FIG. 1.
Figure 3:
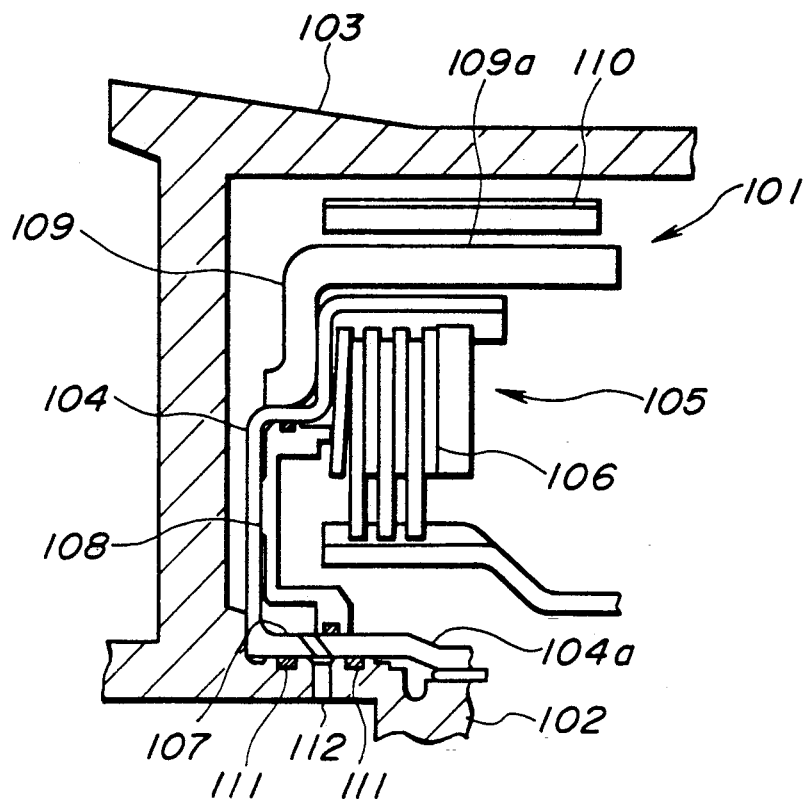
FIG. 3 is a fragmentary sectional view of a conventional clutch drum.
Figure 4:
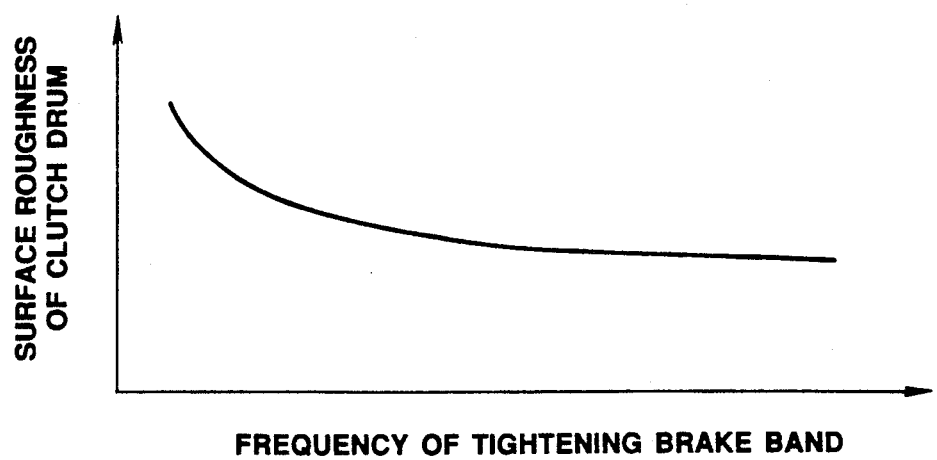
FIG. 4 is a graph showing a disadvantage of the conventional clutch drum of FIG. 3.

Referring now to FIGS. 1 and 2 of the drawings, an embodiment of a rotating drum in an automatic transmission, according to the present invention is illustrated by the reference numeral 10. The rotating drum of this embodiment is a clutch drum forming part of a clutch 12 assembled in the automatic transmission. The clutch drum 10 comprises a drum main body 14 which includes a generally cylindrical hub section 16 which is rotatably mounted on a fixed shaft 18 of a transmission casing 19. A disc section 20 is integral with the hub section 16 and extends radially outwardly. Additionally, a generally cylindrical drum section 22 is integral with the disc section 20 at the outer peripheral portion and extends in the axial direction of the fixed shaft 18. The clutch drum main body 14 is formed into a one-piece structure and made of aluminum alloy.

The drum section 22 is formed at its inner peripheral surface with axial splines for supporting clutch driven plates 26, in which each clutch driving plate 28 is interposed between adjacent driven plates 26. An annular piston 30 is slidably movably disposed within a cylinder 32 formed inside the drum main body 14, the piston being located on the side of the disc section 20. A hydraulic fluid or oil is supplied to a part of the cylinder 32 defined between the piston 30 and the drum main body disc section 20 and between the drum main body hub and drum sections 16, 22. The hydraulic fluid to be supplied to the cylinder 32 has been suitably controlled in pressure. It will be understood that the clutch 12 is engaged when hydraulic fluid is supplied into the hydraulic cylinder 32. In contrast, the clutch 12 is released when the hydraulic fluid is discharged from the cylinder 32.

A cylindrical friction material or frictionally sliding member 34 is fixedly disposed on the drum main body drum section 22 in a manner to surround the outer peripheral surface of the drum section 22. In other words, the friction material 34 is fixedly attached around the outer peripheral surface of the drum section 22 and located coaxial with the drum section 22. The friction material 34 is secured to the drum main body drum section 22 by means of flush head rivets 36 which are annularly arranged or located along the annular end edges of the cylindrical friction material 34. An oil hole 38 is formed through the drum main body drum section 22 and the friction material 34. It will be understood that the friction material 34 is formed of a material (such as steel) which is different from the material (aluminum alloy) of the drum main body 14.

A brake band 39 having a generally C-shape in cross-section is disposed to be wrapped around the cylindrical friction material 34. One end of the band 39 is held with an anchor while the other end is connected to a servo as is conventional though not shown. The servo on the other end of the band tightens the band 39 to hold the clutch drum 10 upon being in slidingly contact with the friction material 34. The band 39 includes an iron ring 39a to which a friction lining material 39b is bonded. The brake band 39 is used to apply a brake to the clutch drum 10 in order to make a shift in the automatic transmission.

The drum main body 14 is rotatably mounted or supported at its hub section 16 on the fixed shaft 18 of the transmission casing 19 through a bearing 40. The fixed shaft 18 is formed with an oil passage 41 through which hydraulic fluid or oil whose pressure has been controlled is supplied into the cylinder 32. A pair of annular seal rings 42, 42, for preventing oil leaks are securely fitted in respective grooves (no numerals) which are formed on the outer peripheral surface of the fixed shaft 18 and located in a manner such that the oil passage 41 is interposed therebetween. A cylindrical wear resisting material or another frictionally sliding member 44 is fixedly secured or attached on the inner peripheral surface of the drum main body hub section 16 and located facing the seal rings 42, 42. The wear resistant material 44 is made of, for example, steel. The wear resisting material 44 is in slidable contact with the seal rings 42, 42. The reference numeral 46 denotes an oil passage through which hydraulic fluid or oil from the oil passage 41 is supplied to the cylinder 32. The oil passage 46 is formed through the wear resisting material 44 and the drum main body hub section 16.

As discussed above, according to this embodiment, the clutch drum main body 14 is provided at its outer peripheral surface (slidably contactable with the brake band 39) with the friction material 34 which is different from the material of the clutch drum main body 14. Accordingly, the clutch drum 10 can always maintain a stable surface roughness and coefficient of friction at the surface slidably contactable with the brake band 39, thereby suppressing a shift shock of the automatic transmission. Additionally, since the friction material 34 is fixed to the drum main body 14 by means of rivets 36, the friction material 34 is readily replaceable with a new one when it is worn away.

Furthermore, by virtue of the friction material 34 used at the frictionally sliding surface of the clutch drum 10, it is unnecessary that the drum main body 14 is formed of steel, and therefore the drum main body 14 is formed of aluminum or aluminum alloy thereby achieving the weight-lightening of the clutch drum 10. Additionally, the clutch drum 10 is formed into a one-piece structure by casting in which the splines 24 for supporting the clutch plates and the cylinder 32 for the piston 30 are simultaneously formed thereby lowering a production cost.

Moreover, the wear resisting material 44 is attached to the inner peripheral surface of the drum main body hub section 16 so as to be in sliding contact with the seal rings 42, 42 mounted on the fixed shaft 18. Accordingly, the hub section 16 can be effectively prevented from being worn away, thereby avoiding an increase in frictional resistance.

While the drum main body 14 has been shown and described as being formed of aluminum or aluminum alloy, it will be understood that it may be formed of steel or steel alloy, in which the drum section 22 can become thin and small by an amount replaced with the friction material 34 thereby maintaining the effects of suppressing the shift shock and achieving the weight-lightening. It will be appreciated that the drum main body 14 may be formed of a pressed steel thin sheet in place of the aluminum or aluminum alloy.

Although the friction material 34 has been shown and described as being fixed to the drum main body 14 by means of the rivets 36, it will be understood that the friction material 34 and/or the wear resisting material 44 may be incorporated with the drum main body 14 during casting of the drum main body 14.

While only the clutch drum has been shown and described as the embodiment, it will be appreciated that the principle of the present invention may be applied to other rotating members or drums having a frictionally sliding surface to which an integer is slidably contactable, in the automatic transmission.

What is claimed is:

1. A rotating drum in an automatic transmission, comprising:
 a drum body rotatably supported on a shaft, said drum main body being formed of an aluminum alloy; and a frictionally sliding member fixedly secured on an outer peripheral surface of said drum main body, said frictionally sliding member being formed of steel and being slidingly contactable with a brake band disposed around said drum main body.

2. A rotating drum as claimed in claim 1, wherein said brake band includes a ring member and a friction lining material secured on an inner surface of said ring member, said brake band being in sliding contact with said frictionally sliding member.

3. A rotating drum as claimed in claim 1, wherein said drum main body includes a cylindrical drum section which is coaxial with said shaft and extends in an axial direction of said shaft, said frictionally sliding member is cylindrical and located along and in tight contact with said outer peripheral surface of said drum main body, and said rotating drum further includes rivets by which said frictionally sliding member is fixed to said drum main body.

4. A rotating drum as claimed in claim 3, wherein said drum main body further includes a generally cylindrical hub section which is rotatably supported on said shaft, and a disc section which is integral with said hub section and which extends radially outwardly, said disc section being integral with said cylindrical drum section.

5. A rotating drum as claimed in claim 1, further comprising a transmission housing and wherein said shaft is fixed to and forms part of said transmission housing.

6. A rotating drum as claimed in claim 4, wherein said drum main body, including said hub, disc and drum sections, is a unitary one-piece structure.

7. A rotating drum as claimed in claim 1, wherein said frictionally sliding member is slidingly contactable with a brake band disposed around said drum main body and frictionally sliding member.

* * * * *